(12) United States Patent
Spies et al.

(10) Patent No.: US 12,104,592 B2
(45) Date of Patent: Oct. 1, 2024

(54) COMPRESSOR MODULE

(71) Applicant: Hanon Systems, Daejeon (KR)

(72) Inventors: Toni Spies, Cologne (DE); Philipp Kozalla, Frenchen (DE); Roman Heckt, Aachen (DE); Thomas Klotten, Cologne (DE); Jörn Fröhling, Cologne (DE); Torsten Gehm, Cologne (DE); Stephan Köster, Langerwehe (DE); Felix Girmscheid, Cologne (DE)

(73) Assignee: HANON SYSTEMS, Daejeon (KR)

( * ) Notice: Subject to any disclaimer, the term of this patent is extended or adjusted under 35 U.S.C. 154(b) by 147 days.

(21) Appl. No.: 17/597,180

(22) PCT Filed: Aug. 26, 2020

(86) PCT No.: PCT/KR2020/011396
§ 371 (c)(1),
(2) Date: Dec. 28, 2021

(87) PCT Pub. No.: WO2021/054634
PCT Pub. Date: Mar. 25, 2021

(65) Prior Publication Data
US 2022/0307500 A1    Sep. 29, 2022

(30) Foreign Application Priority Data

Sep. 17, 2019  (DE) .................. 10 2019 124 924.4
Aug. 6, 2020   (DE) .................. 10 2020 120 772.7

(51) Int. Cl.
| F04C 18/02 | (2006.01) |
| F04C 29/04 | (2006.01) |
| F25B 5/02  | (2006.01) |
| F25B 31/02 | (2006.01) |

(52) U.S. Cl.
CPC ........ *F04C 18/0215* (2013.01); *F04C 29/047* (2013.01); *F25B 5/02* (2013.01); *F25B 31/02* (2013.01); *F04C 2210/261* (2013.01); *F04C 2240/30* (2013.01); *F04C 2270/185* (2013.01); *F04C 2270/195* (2013.01)

(58) Field of Classification Search
CPC ............ F25B 2309/06; F25B 2400/054; F25B 2400/07; F25B 2400/071; F25B 2600/021;
(Continued)

(56) References Cited

U.S. PATENT DOCUMENTS

| 1,886,553 A | 11/1932 | Kercher |
| 6,807,821 B2 | 10/2004 | Narney |

(Continued)

FOREIGN PATENT DOCUMENTS

| DE | 102018201581 A1 | 8/2019 |
| EP | 2832564 A1 | 2/2015 |

(Continued)

*Primary Examiner* — Anthony Ayala Delgado
(74) *Attorney, Agent, or Firm* — James D. Miller; Shumaker, Loop & Kendrick, LLP

(57) ABSTRACT

A compressor module for a refrigerant circuit of a motor vehicle air-conditioning system, exhibiting a modular multi-part housing with a low-pressure refrigerant inlet, a high-pressure refrigerant outlet and a compressor, characterized in that an inner heat exchanger of the refrigerant circuit is produced such that it is integrated into the compressor module, wherein the housing of the compressor module fully encloses the inner heat exchanger.

29 Claims, 9 Drawing Sheets

(58) Field of Classification Search
CPC ...... F25B 2700/1931; F25B 2700/2113; F25B 2700/2115; F25B 2700/21152; F25B 2700/21171; F25B 31/02; F25B 40/00; F25B 49/025; F25B 5/02; F04C 18/0215; F04C 2210/261; F04C 2240/30; F04C 2270/185; F04C 2270/195; F04C 29/045; F04C 29/047; F01C 21/10; B60H 1/3223; B60H 1/3227
See application file for complete search history.

(56) References Cited

U.S. PATENT DOCUMENTS

| | | | |
|---|---|---|---|
| 2012/0267075 A1 | 10/2012 | Kremer et al. | |
| 2015/0059382 A1* | 3/2015 | Noda | B60H 1/32281 62/468 |
| 2016/0363357 A1* | 12/2016 | Yamamoto | F25B 13/00 |
| 2017/0211869 A1 | 7/2017 | Barito et al. | |

FOREIGN PATENT DOCUMENTS

| | | | | |
|---|---|---|---|---|
| EP | 3318822 | A1 | 5/2018 | |
| JP | 2004516191 | A | 6/2004 | |
| JP | 2005146987 | A * | 6/2005 | ............... F25B 1/04 |
| JP | 2007009789 | A | 1/2007 | |
| JP | 2007040278 | A | 2/2007 | |
| JP | 2008014629 | A | 1/2008 | |
| JP | 2014059120 | A | 4/2014 | |
| JP | 2015038355 | A | 2/2015 | |
| JP | 2019521283 | A | 7/2019 | |
| KR | 20030007436 | A | 1/2003 | |
| KR | 20180095456 | A | 8/2018 | |
| WO | 2007040519 | A1 | 4/2007 | |

\* cited by examiner

COMPRESSOR MODULE

CROSS-REFERENCE TO RELATED PATENT APPLICATIONS

This patent application is a United States national phase patent application based on PCT/KR2020/011396 filed on Aug. 26, 2020, which claims the benefit of German Patent Application No. 10 2020 120 772.7 filed on Aug. 6, 2020 and German Patent Application No. 10 2019 124 924.4 filed on Sep. 17, 2019, the entire disclosures of which are hereby incorporated herein by reference.

TECHNICAL FIELD

The present invention relates to a compressor module for a refrigerant circuit of a motor vehicle air-conditioning system. The compressor module implements an integrated design of various components and functionalities of a refrigerant circuit within a modular component.

The compressor module is particularly preferred for use in R744 refrigerant circuits that employ carbon dioxide as refrigerant.

BACKGROUND ART

Refrigerant circuits are constructed from various technical components. When developing these components, there is a desire to design these such that they are as cost-efficient as possible and, for example, also as space-saving as possible. Collectors that are integrated into heat exchangers or refrigerant compressors are therefore already known from the state of the art.

For example, a refrigerant compressor with an integrated collector is already known from US 2004/0141859 A1. However, the space saving that can be achieved here is limited. The advantages for the refrigerant circuit and the stability of the components that can be achieved by integrating the collector into the housing of the compressor are also not significant.

SUMMARY

The purpose of the present invention lies, in particular, in reducing the complexity of the integrated modular components for refrigerant circuits that employ R744 as refrigerant. In addition to this, the objective is to minimize the number of necessary individual components and parts of a refrigerant circuit, as well as to achieve synergies between the individual components with a view to realizing savings in terms of the costs typically required to secure the requisite pressure resistance of such components.

The object is resolved by using apparatus that exhibits the characteristics as shown and described herein.

The object of the invention is, in particular, resolved with a compressor module for a refrigerant circuit of a motor vehicle air-conditioning system that exhibits a modular, multi-part housing which can be assembled and displays one low-pressure refrigerant inlet and one high-pressure refrigerant outlet, as well as one refrigerant compressor. The compressor module is also, in particular, characterized in that an inner heat exchanger of the refrigerant circuit is produced such that it is integrated into the compressor module, wherein the housing of the compressor module completely encloses the inner heat exchanger and thereby houses both this and the actual compressor.

The conceptual design of the invention therefore lies in producing the component of the compressor and the component of the inner heat exchanger in combination with one another in a compressor module or as a compressor module. This not only utilizes, in a particularly beneficial way, the advantage of simplified installation of the module in the refrigerant circuit, but also extends the housing of the compressor in a modular way with a housing or housing parts which house the inner heat exchanger, so that this inner heat exchanger no longer requires a separate, dedicated, pressure-resistant housing of its own.

The compressor module preferably contains at least one refrigerant sensor, which is produced such that it is integrated into the housing of the compressor module. Alongside various refrigerant lines, preferably integrated into the housing, the refrigerant sensors required at the corresponding points in the circuit are therefore also arranged in a pressure-tight housing that fulfils the requirements of the R744 refrigerant or are enclosed by the housing.

Alongside the inner heat exchanger, a refrigerant collector of the refrigerant circuit is preferably also produced such that it is integrated into the housing of the compressor module.

Housing the refrigerant collector in the compressor module also reduces the number of individual components and connection elements required for the refrigerant circuit, which has the effect of simplifying assembly, as well as securing the beneficial pressure-tight design of an overall housing for the compressor module, which in turn facilitates cost-efficient manufacturing.

In the preferred embodiment, a further heat exchanger of the refrigerant circuit is integrated into the housing of the compressor module.

This further heat exchanger is preferably a chiller, as well as an expansion element that is fitted upstream of the chiller, which are together integrated into the housing of the compressor module, as well as being enclosed by and housed in this housing, wherein the housing secures outward pressure tightness.

The design principle for the housing of the compressor module is described in an exemplary way by the housing parts of the compressor module being produced such that they are assembled as disc-like elements and can therefore also be extended in a modular way.

In an advantageous embodiment, the housing of the compressor module is produced from an inverter housing, a motor housing, a central housing and a high-pressure housing, wherein the refrigerant is routed from the refrigerant inlet at low pressure, via the inverter housing, the motor housing and the central housing to the high-pressure housing. The inner heat exchanger is arranged in the central housing here.

In a particularly preferred embodiment, the housing of the compressor module is produced from a housing for the refrigerant collector, a housing for the inner heat exchanger, a motor housing, a central housing and a high-pressure housing. In this arrangement, the refrigerant flows in series from the refrigerant inlet at low pressure, via the refrigerant collector, the inner heat exchanger, the motor housing and the central housing to the high-pressure housing. The inner heat exchanger is arranged between the refrigerant collector and the motor housing.

In an alternative embodiment of the compressor module, the housing of the compressor module is produced from a housing for the chiller and the expansion element, a housing for the refrigerant collector, a housing for the inner heat exchanger, a motor housing, a central housing and a high-pressure housing. In this arrangement, the refrigerant flows from the refrigerant inlet at low pressure, via the expansion element and subsequent chiller, the refrigerant collector, the inner heat exchanger, the motor housing and the central housing to the high-pressure housing. The inner heat exchanger is arranged between the refrigerant collector and the motor housing here.

An advantageously modified compressor module is achieved by the housing of the compressor module being produced from an inverter housing, a motor housing, a housing for the inner heat exchanger, a central housing and a high-pressure housing. Here, the refrigerant flows from the refrigerant inlet at low pressure, via the motor housing and the central housing to the high-pressure housing. The inner heat exchanger is arranged in the central housing and between the motor housing and the high-pressure housing.

The housing of the compressor module is advantageously produced from an inverter housing, a housing for the inner heat exchanger, a motor housing, a central housing and a high-pressure housing. The refrigerant is routed from the refrigerant inlet at low pressure, via the inverter housing, the housing for the inner heat exchanger, the motor housing and the central housing to the high-pressure housing. The inner heat exchanger is arranged between the inverter housing and the motor housing here.

Another alternative is for the housing of the compressor module to be produced advantageously from an inverter housing, a motor housing, a central housing and a high-pressure housing, wherein the refrigerant is routed from the refrigerant inlet at low pressure, via the inverter housing, the inner heat exchanger, the motor housing and the central housing to the high-pressure housing or via the inverter housing, the motor housing, the inner heat exchanger and the high-pressure housing or via the inverter housing and, in parallel, via the inner heat exchanger and the motor housing and subsequently via the central housing to the high-pressure housing. The inner heat exchanger is arranged in the motor housing and between the inverter housing and the central housing here.

According to a further embodiment, the housing of the compressor module is advantageously produced from a housing for a refrigerant collector, a housing for the inner heat exchanger, a motor housing, a central housing and a high-pressure housing. Here, the refrigerant is routed from the refrigerant inlet at low pressure, via the housing for the refrigerant collector, the housing for the inner heat exchanger, the motor housing and the central housing to the high-pressure housing. The inner heat exchanger is arranged between the refrigerant collector and the motor housing here.

According to a further alternative embodiment, the housing of the compressor module is advantageously produced from a housing for the refrigerant collector, a housing for the inner heat exchanger, an inverter housing, a motor housing, a central housing and a high-pressure housing, wherein the refrigerant is routed from the refrigerant inlet at low pressure, via the housing for the refrigerant collector, the housing for the inner heat exchanger, the inverter housing, the motor housing and the central housing to the high-pressure housing. The inner heat exchanger is then arranged between the refrigerant collector and the inverter housing.

In a beneficial and alternative embodiment, the housing of the compressor module is produced from a housing for a refrigerant collector, a housing for the inner heat exchanger, a motor housing, a central housing and a high-pressure housing. The refrigerant is routed from the refrigerant inlet at low pressure, via the housing for the refrigerant collector, the inner heat exchanger, the motor housing and the central housing to the high-pressure housing. The inner heat exchanger is arranged between the motor housing and the central housing.

In another beneficial and alternative embodiment, the housing of the compressor module is to be produced from a housing for the refrigerant collector, a motor housing, a central housing and a high-pressure housing, wherein the refrigerant is routed from the refrigerant inlet at low pressure, via the refrigerant collector, the inner heat exchanger, the motor housing and the central housing to the high-pressure housing or via the refrigerant collector, the motor housing, the inner heat exchanger and the high-pressure housing or via the refrigerant collector and, in parallel, via the inner heat exchanger and the motor housing and subsequently via the central housing to the high-pressure housing. The inner heat exchanger is arranged in the motor housing and between the refrigerant collector and the central housing.

A further advantageous embodiment lies in the housing of the compressor module being produced from a housing for the chiller and the expansion element, a housing for the refrigerant collector, a housing for the inner heat exchanger, an inverter housing, a motor housing, a central housing and a high-pressure housing. The refrigerant is then routed from the refrigerant inlet at low pressure, via the expansion element, the chiller, the refrigerant collector, the inner heat exchanger, the inverter housing, the motor housing and the central housing to the high-pressure housing. The inner heat exchanger is arranged between the refrigerant collector and the inverter housing.

Alternatively, the housing of the compressor module is produced from a housing for the chiller and the expansion element, a housing for the refrigerant collector, a motor housing, a housing for the inner heat exchanger, a central housing and a high-pressure housing. The refrigerant is then routed from the refrigerant inlet at low pressure, via the expansion element, the chiller, the refrigerant collector, the motor housing, the inner heat exchanger and the central housing to the high-pressure housing. The inner heat exchanger is arranged between the motor housing and the central housing.

Alternatively, the housing of the compressor module is produced from a housing for the chiller and the upstream expansion element, a housing for the refrigerant collector, a motor housing, a central housing and a high-pressure housing. The refrigerant is routed from the refrigerant inlet at low pressure, via the expansion element, the chiller, the refrigerant collector, the inner heat exchanger, the motor housing and the central housing to the high-pressure housing or via the expansion element, the chiller, the refrigerant collector, the motor housing, the inner heat exchanger and the high-pressure housing or via the expansion element, the chiller, the refrigerant collector and, in parallel, via the inner heat exchanger and the motor housing and subsequently via the central housing to the high-pressure housing. The inner heat exchanger in the motor housing is arranged in the motor housing and between the refrigerant collector and the central housing.

The preferred embodiment is for the inner heat exchanger to be produced as a cylindrical coiled tube that is arranged coaxially to the shaft of the compressor module. The cylindrical coiled tube routes the refrigerant mass flow at high pressure and is surrounded by the low-pressure refrigerant mass flow, the suction pressure of the compressor.

According to an advantageous embodiment, the inner heat exchanger is housed partially by the motor housing and partially by the central housing in the axial direction, as well as being enclosed by the motor housing and by the central housing in the radial direction.

The inner heat exchanger is arranged coaxially between an outer guide housing and an inner guide housing in the radial direction.

The refrigerant collector is preferably arranged in a central housing and a housing cover that limits the housing axially at the end, wherein the refrigerant collector exhibits a liquid separator, a cup-shaped separating element and a gas intake pipe for the low-pressure side of the inner heat exchanger that are used to capture refrigerant liquid from the refrigerant gas stream.

The inner heat exchanger is advantageously arranged coaxially in the radial direction between the inner guide housing and a cylindrical section of the housing cover, wherein a disc-type partition element is arranged as a boundary to the refrigerant collector in the axial direction.

The inner heat exchanger is advantageously arranged coaxially in the radial direction between the outer guide housing and an inner guide housing, wherein the outer guide housing exhibits a disc-type partition element as a boundary to the refrigerant collector in the axial direction.

The inner guide housing is preferably produced for holding the filter material and exhibits a filter for the refrigerant.

The compressor is preferably produced as an electrical compressor, particularly preferably as a scroll compressor.

In summary, the benefits of the invention can be described as follows:

- By integrating parts or components of the refrigerant circuit into the compressor, the complexity of the overall system is reduced directly.
- Integration of the PT sensor into the compressor makes it possible to dispense with connectors, housings, a cable harness, as well as the installation work required during vehicle assembly, which in turn leads to a reduction in time, costs and installation space.
- Integration of the inner heat exchanger also leads to synergies in the pressure housing. At least one refrigerant line can then be omitted and a reduction in the number of screw connection points of the components in the vehicle is achieved.
- A reduction in the amount of installation work required during vehicle manufacturing can also be seen as an advantageous effect that results from integration of the components.
- Integration of the refrigerant collector means that an oil return with oil storage can be implemented in the refrigerant collector on the low-pressure side without the oil needing to circulate through the overall system. In the refrigerant collector, the temperature is reduced from hot gas temperature to suction gas temperature, which increases the viscosity of the oil. This increased viscosity is beneficial for operation of the compressor, as it increases the lubrication capability for bearings and other components.
- Integration of the chiller also leads to synergies in the pressure housing, in particular since refrigerant lines are no longer needed and due to lower installation costs during vehicle assembly.

BRIEF DESCRIPTION OF DRAWINGS

Further details, features and benefits of embodiments of the invention result from the following description of embodiment examples with reference to the accompanying drawings. These display the following.

DETAILED DESCRIPTION OF AN EMBODIMENT

Figure 1:
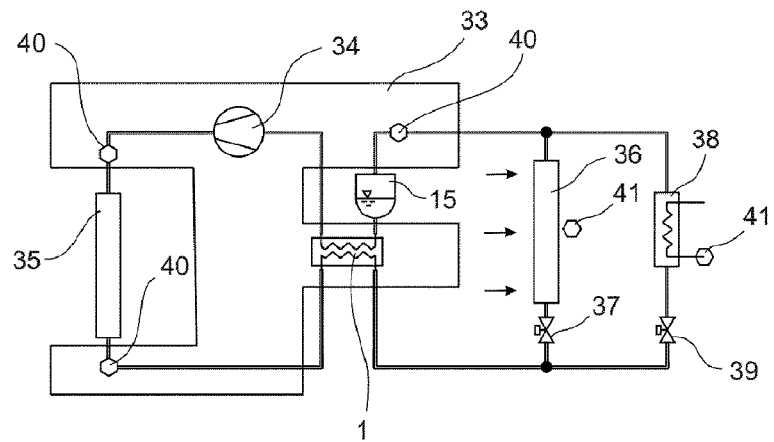
FIG. 1: Circuit diagram of a refrigerant circuit with compressor module and integrated inner heat exchanger.

FIG. 1 shows a circuit diagram of a refrigerant circuit for R744 with a compressor module 33. The compressor module 33 is assembled from multiple components. Alongside the main components, namely the electrical compressor 34 for the refrigerant and the inner heat exchanger 1, it also contains various refrigerant sensors, in particular pressure/temperature sensors 40. Here, a refrigerant sensor for pressure and temperature is arranged at the compressor outlet, while another refrigerant sensor 40 is arranged inside the compressor module 33 at the inlet of the refrigerant into the compressor module 33, downstream of the gas cooler 35 and upstream of the inner heat exchanger 1. Downstream of the high-pressure side of the inner heat exchanger 1, the refrigerant is routed via the evaporator 36 that is arranged in parallel in the circuit with assigned expansion element 37, as well as the chiller 38 with assigned expansion element 39 either in parallel or alternatively to one another, depending on the mode of operation and position of the valves not shown. The refrigerant vapor is then measured by the refrigerant sensor 40 on the low-pressure side after entering the compressor module 33, before the refrigerant vapor is routed to the refrigerant collector 15 arranged outside the compressor module and subsequently into the inner heat exchanger 1 of the compressor module 33. The refrigerant vapor from the inner heat exchanger 1 is ultimately routed to the suction side of the compressor 34. The circuit is completed by temperature sensors 41, which are for example used to measure the air temperature at the evaporator 36, as well as to measure the temperature of the refrigerant at the chiller 38. Integration of the components of the compressor 34, the inner heat exchanger 1 and the refrigerant sensors 40 into a compressor module 33 reduces the total costs of the system thanks to the high degree of integration. This is achieved by reducing the number of individual components in the cooling system for an R744 refrigerant thanks to the high degree of integration of the components. The inner heat exchanger 1 is integrated by housing it in the housing of the compressor, which is then designated as the housing of the compressor module 33. Here, the benefits of the existing pressure housing structure of the compressor 34 are used and the inner heat exchanger 1 can be integrated into the housing on the low-pressure side at low cost. All necessary refrigerant sensors 40 are also integrated into the housing, so that no further refrigerant sensors need to be positioned in the circuit at other locations. The central arrangement of the refrigerant sensors inside the compressor module 33 can be performed in a section of the inverter board. This leads both to a reduction in leakage and less complex electrical connection of the components. In addition, no special sensor housing is then required for the sensors. The sensor signals are transmitted via the data networks that are already in place for the compressor, for example via CAN/CAN FD or LIN. In addition to this, the integration results in improved inverter and/or motor efficiency of the electrical compressor 34 due to the low temperature level, as better cooling of the compressor motor is achieved thanks to the integration.

Figure 2:
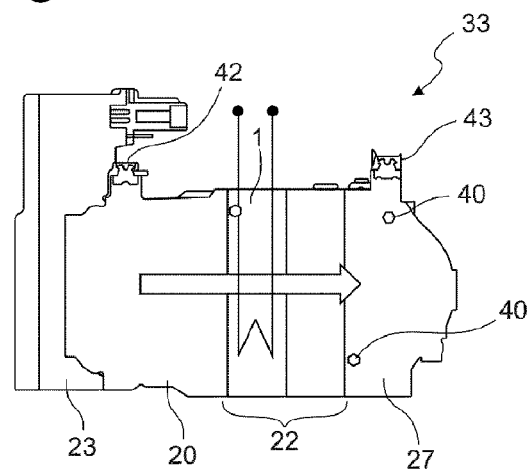
FIG. 2: Schematic diagram of a compressor module with multi-part housing.

FIG. 2 shows a schematic diagram of a compressor module 33 that is produced from disc-type housing modules. The disc-type housing modules are connected to one another using seals and form a compact overall compressor module housing. Various versions and combinations of the housing modules are described in the embodiments in the following.

According to the embodiment as per FIG. 2, the inverter housing 23 is arranged at one end inside the compressor module 33 here. The motor housing 20 is connected to the refrigerant inlet 42 at low pressure. The central housing 22 then houses the inner heat exchanger 1, while the high-pressure housing 27 is arranged with the mechanical operating elements of the compressor at one end.

In the embodiment shown as a scroll compressor, the operating elements of the compressor are produced as a fixed and orbiting scroll. In addition to this, refrigerant sensors 40 are integrated into the housing.

The high-pressure refrigerant outlet 43 is arranged radially on the high-pressure housing 27. The inner heat exchanger 1 is positioned in the central housing 22, and the refrigerant on the low-pressure side flows from the refrigerant inlet 42 at low pressure, via the inverter housing 23 as well as the electric motor in the motor housing 20, via the inner heat exchanger 1 of the central housing 22 to the high-pressure housing 27, where the refrigerant vapor is compressed, and then ultimately exits the compressor module 33 via the refrigerant outlet 43 at high pressure. The flow of refrigerant through the components listed takes place from the inlet to the outlet with these components connected in series and is marked by an arrow.

Figure 3:
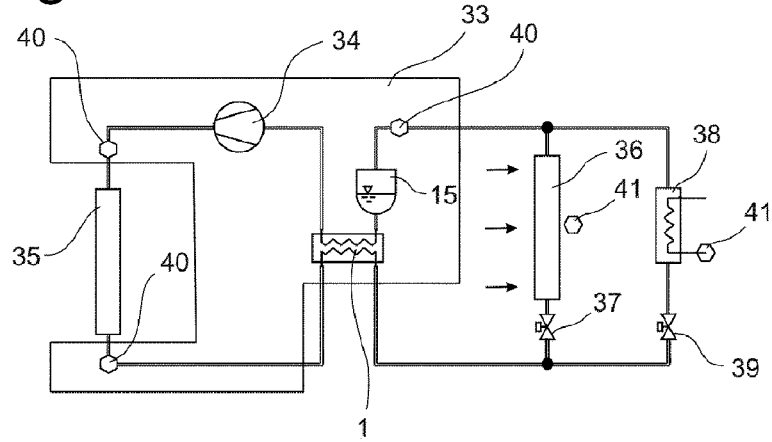
FIG. 3: Circuit diagram of a refrigerant circuit with compressor module and integrated heat exchanger, as well as refrigerant collector.

FIG. 3 shows a circuit diagram of the refrigerant circuit with the same structure as shown in FIG. 1. In contrast to the circuit depicted as per FIG. 1, however, FIG. 3 shows the compressor module 33 that has been extended by integrating the refrigerant collector 15 into the compressor module 33. All other components and the refrigerant circuit itself otherwise remain unchanged. Thanks to the further increased level of integration of the compressor module 33 that results from incorporating the refrigerant collector 15, the total costs of the system are further reduced.

Figure 4:
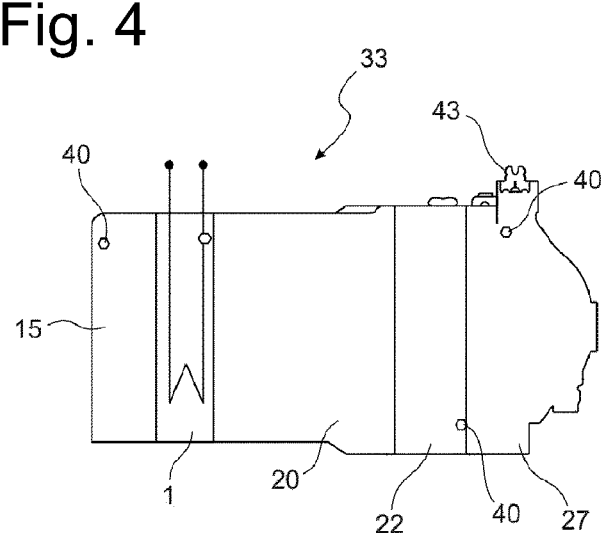
FIG. 4: Schematic diagram of a compressor module with multi-part housing.

FIG. 4 shows the compressor module 33 that is schematically suggested in FIG. 3 as a schematic diagram with the design comprising disc-type housing modules. The compressor module 33 is limited on one end by the refrigerant collector 15. The inner heat exchanger 1, the motor housing 20, the central housing 22 and ultimately the high-pressure housing 27 are then arranged in the axial direction. The refrigerant sensors 40 are integrated into the housing of the compressor module 33 at the corresponding points shown and labelled schematically. The refrigerant collector 15, which is also referred to as the accumulator, is arranged at the refrigerant inlet, while the inner heat exchanger 1 is located between the refrigerant collector 15 and the electric motor of the compressor and its motor housing 20. On the low-pressure side, the refrigerant flows from the refrigerant inlet, via the refrigerant collector 15, the inner heat exchanger 1 on the low-pressure side and the electric motor in the motor housing 20 to the high-pressure housing 27 with the scroll compressor and, from there, to the refrigerant outlet 43 at high pressure.

Figure 5:
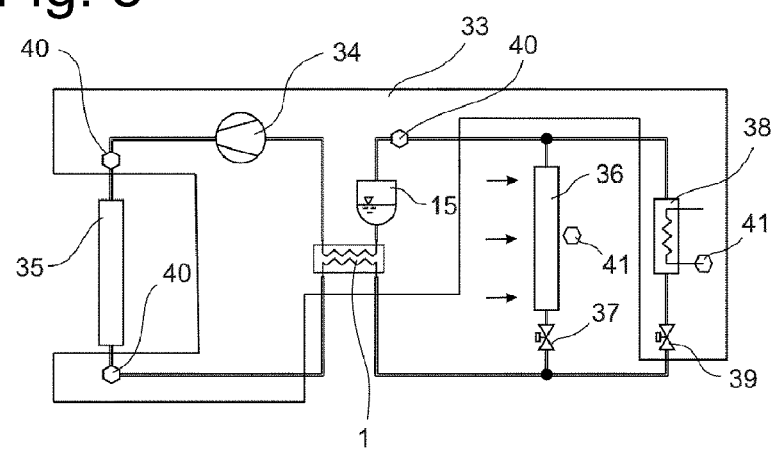
FIG. 5: Circuit diagram of a refrigerant circuit with compressor module, inner heat exchanger, refrigerant collector and chiller.

FIG. 5, on the other hand, shows a circuit diagram of a refrigerant circuit that is analogous to the circuits from FIG. 1 and FIG. 3. The refrigerant circuit as per FIG. 5 shows the compressor module 33 with an additional component added. The component in question is a heat exchanger that is also integrated into the compressor module 33. In the embodiment shown, the heat exchanger is produced as a chiller 38 with assigned expansion element 39.

Figure 6:
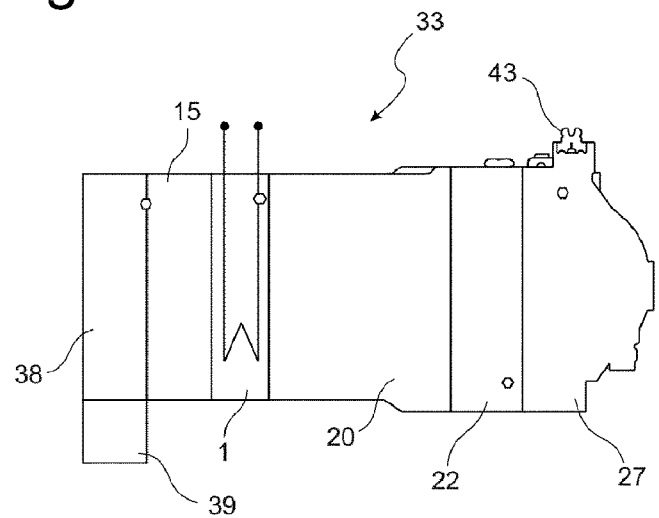
FIG. 6: Schematic diagram of a compressor module with multi-part housing.

FIG. 6 shows an example of a compressor module 33 according to the circuit shown in FIG. 5. The refrigerant collector 15, the chiller 38 and the associated expansion element 39 are also all integrated into the compressor module 33. In addition, the inner heat exchanger 1 is arranged between the refrigerant collector 15 and the motor housing 20. The central housing 22 and the high-pressure housing 27 are connected. The refrigerant collector 15 can exhibit more than one refrigerant inlet here, while the refrigerant collector 15, the inner heat exchanger 1 and the chiller 38, as well as the expansion element 39, are all integrated into the housing of the compressor module 33. The refrigerant collector 15, the chiller 39 and the inner heat exchanger 1 can therefore make use of the pressure vessel structures of the compressor housing on the low-pressure side, which leads to a reduction in costs. In addition to this, all necessary refrigerant sensors are integrated into the housing of the compressor module 33, which results in direct benefits, as well as benefits associated with central control and the arrangement on a section of the inverter board.

This in particular leads to reduced leakage and a less complex electrical circuit, meaning that no special sensor housings are required, which in turn significantly reduces costs. In addition to the compressor signals, signal transmission is also possible, as already described, via the corresponding networks already in place for compressor control. This results in improved inverter and electric motor efficiency thanks to the lower temperatures inside the compressor module 33 as a result of the suction gas cooling.

The flow of refrigerant starts with refrigerant at high pressure at the expansion element 39. The expanded, low-pressure refrigerant is then routed via the chiller 38 and via the refrigerant collector 15, the inner heat exchanger 1 and the electric motor in the motor housing 20 to the scroll compressor unit in the high-pressure housing 27 and then to the refrigerant outlet 43 at high pressure.

Figure 7:
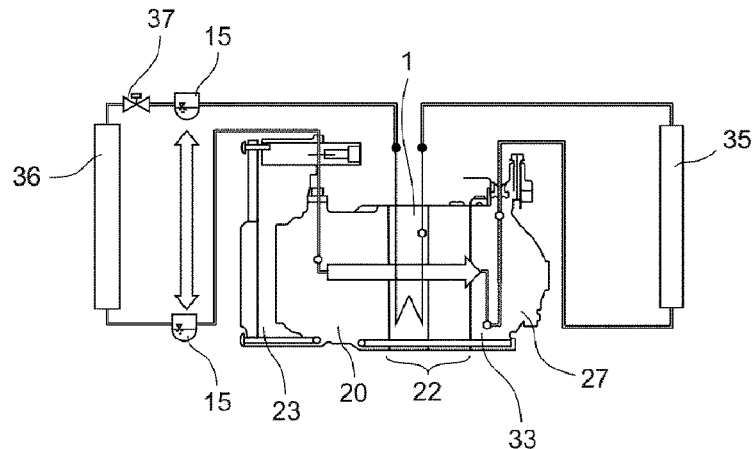
FIG. 7: Circuit diagram of a refrigerant circuit with schematic diagram of the compressor module.

FIG. 7 shows a refrigerant circuit with a compressor module 33 that is integrated into a circuit, wherein a refrigerant collector 15 is either arranged in the low-pressure section downstream of the evaporator 36 or in the high-pressure section upstream of the expansion element 37 of the evaporator 36. Here, the compressor module 33 comprises the inverter housing 23, the motor housing 20, the central housing 22 with the inner heat exchanger 1, as well as the high-pressure housing 27. The refrigerant circuit is completed by the gas cooler 35.

In this embodiment, the refrigerant circuit can be used for a multi-evaporator system. The refrigerant flows in the direction of the arrow on the low-pressure side via the inverter in the inverter housing 23, the electric motor in the motor housing 20 and the inner heat exchanger 1 in the central housing 22 to the high-pressure housing 27 and to the outlet for the refrigerant.

Figure 8:
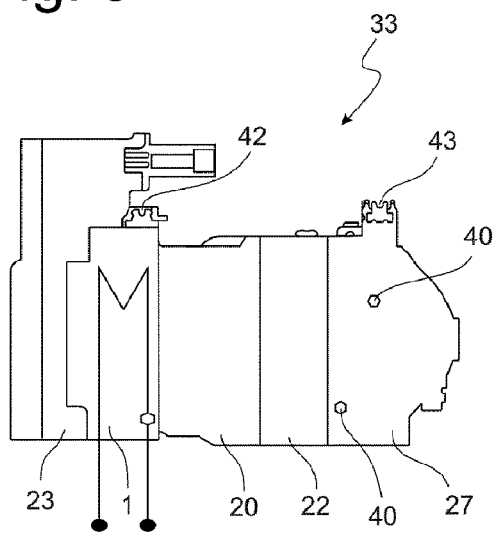
FIG. 8: Schematic diagram of a compressor module with multi-part housing.

FIG. 8 shows a divergence with regard to the arrangement of the inner heat exchanger 1 in comparison with the arrangement shown as per FIG. 7. Here, the positions of the inner heat exchanger 1 and the motor housing 20 have been switched. According to another alternative that is not shown, the inner heat exchanger 1 is switched with the inverter housing 23, so that the refrigerant on the low-pressure side flows via the inner heat exchanger 1 and the inverter housing 23 and is subsequently routed via the motor housing 20 and the central housing 22 to the high-pressure housing 27.

Figure 9:
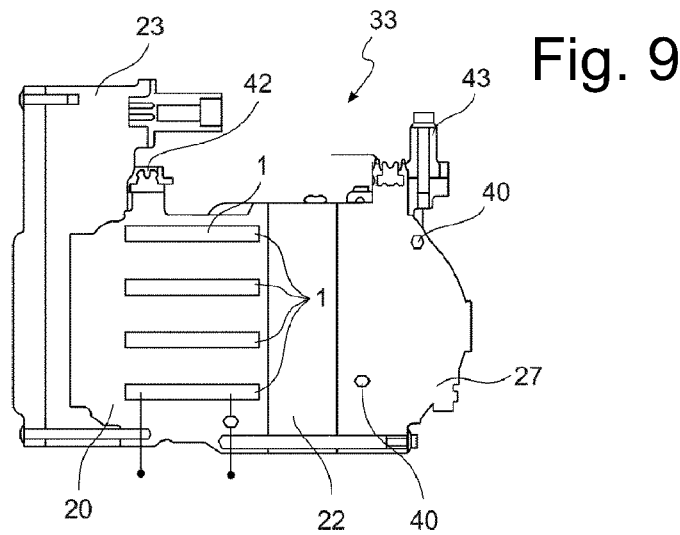
FIG. 9: Schematic diagram of a compressor module with multi-part housing.

FIG. 9 shows a compressor module 33 that integrates the inner heat exchanger 1 in a different design. The inner heat exchanger 1 is arranged parallel to the electric motor of the compressor. The refrigerant can then flow in various ways on the low-pressure side. One of these is from the refrigerant inlet 42 at low pressure, via the inverter in the inverter housing 23 to the electric motor in the motor housing 20, ultimately via the inner heat exchanger 1 and the central housing 22 to the high-pressure housing 27 with the spiral compressor unit. The refrigerant exits the refrigerant outlet 43 and the compressor module 33 at high pressure.

Alternatively, the refrigerant on the low-pressure side can flow from the low-pressure refrigerant inlet 42, via the inverter in the inverter housing 23 to the inner heat exchanger 1 and then to the electric motor in the motor housing 20, via the central housing to the high-pressure housing 27. In another alternative, the refrigerant can flow at low pressure from the refrigerant inlet 42, at low pressure via the inverter in the inverter housing 23 and then in parallel via the inner heat exchanger 1 and the electric motor in the motor housing 20 to the high-pressure housing 27.

Figure 10:
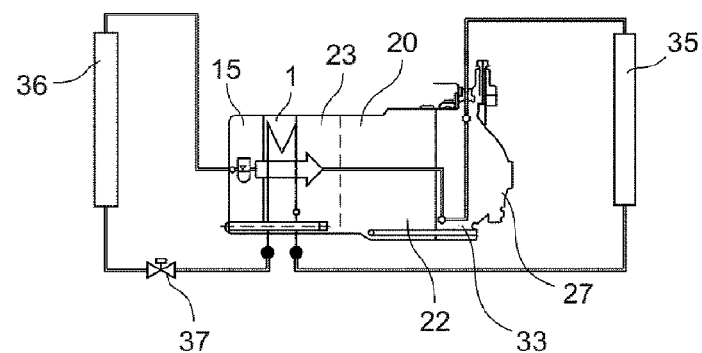
FIG. 10: Circuit diagram of a refrigerant circuit with schematic diagram of the compressor module.

FIG. 10 shows a refrigerant circuit with the compressor module 33 that is similar to the depiction of the circuit in FIG. 7. The compressor module 33 is characterized here by the fact that the refrigerant collector 15 is integrated into the housing of the compressor module 33. In addition to this, the inner heat exchanger 1 is integrated into the housing of the compressor module 33, wherein the benefit of using the existing pressure housing of the compressor housing for the refrigerant collector 15 and the inner heat exchanger 1 on the low-pressure side is also utilized with this design, which leads to a reduction in costs. All required refrigerant sensors are also integrated into the housing of the compressor module 33 here. Reference has already been made above to the benefits associated with reduced leakage, less complex wiring and the ability to dispense with a special sensor housing, as well as to the option to transmit the sensor signals via the signal system of the compressor and the improved inverter and motor efficiency that can be achieved thanks to the lower temperatures.

On the low-pressure side, the refrigerant flows from the refrigerant collector 15, via the inner heat exchanger 1, the inverter housing 23, as well as the electric motor in the motor housing 20 and the central housing 22, to the high-pressure housing 27.

Figure 11:
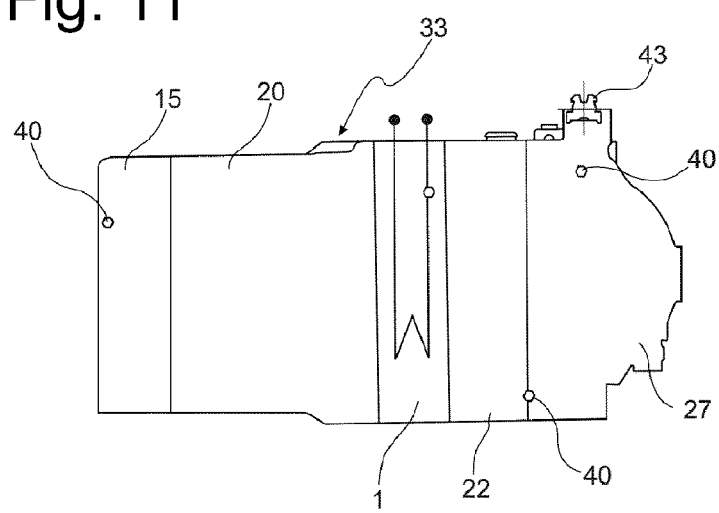
FIG. 11: Schematic diagram of a compressor module with multi-part housing.

FIG. 11 shows the refrigerant collector 15 with the refrigerant inlet into the compressor module 33, wherein the inner heat exchanger 1 is arranged between the electric motor and the spiral compressor unit, and thereby between the motor housing 20 and the central housing 22, as well as the high-pressure housing 27. On the low-pressure side, the refrigerant flows from the low-pressure refrigerant inlet, via the refrigerant collector 15, the electric motor in the motor housing 20 and the inner heat exchanger 1 to the high-pressure housing 27 and then to the compressor outlet, the refrigerant outlet 43, at high pressure. In addition to this, refrigerant sensors 40 are integrated into the housing.

Figure 12:
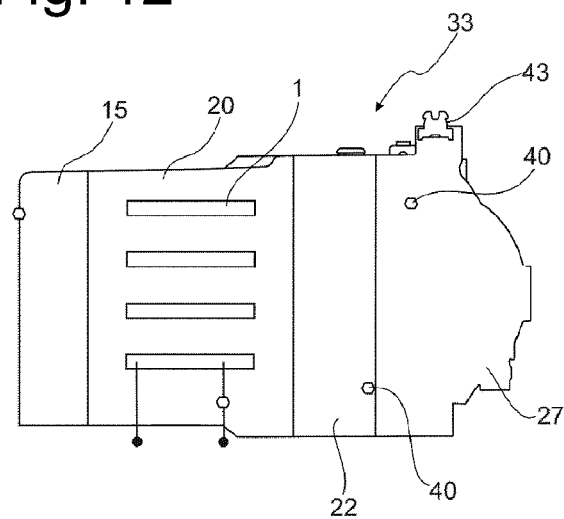
FIG. 12: Schematic diagram of a compressor module with multi-part housing.

FIG. 12 is a schematic diagram of the compressor module 33 with a similar connection as the one shown in FIG. 9, wherein the inverter with the inverter housing 23 from FIG. 9 is replaced by the refrigerant collector 15 in FIG. 12. The refrigerant on the low-pressure side again flows in three different ways (different versions). Firstly, via the refrigerant collector 15 to the electric motor in the motor housing 20, via the inner heat exchanger 1 to the high-pressure housing 27 with the scroll compressor unit. In the subsequent version of refrigerant flow on the low-pressure side, the position of the inner heat exchanger 1 and electric motor have been switched and, in another version, the refrigerant on the low-pressure side flows in parallel via the electric motor and the inner heat exchanger 1.

Figure 13:
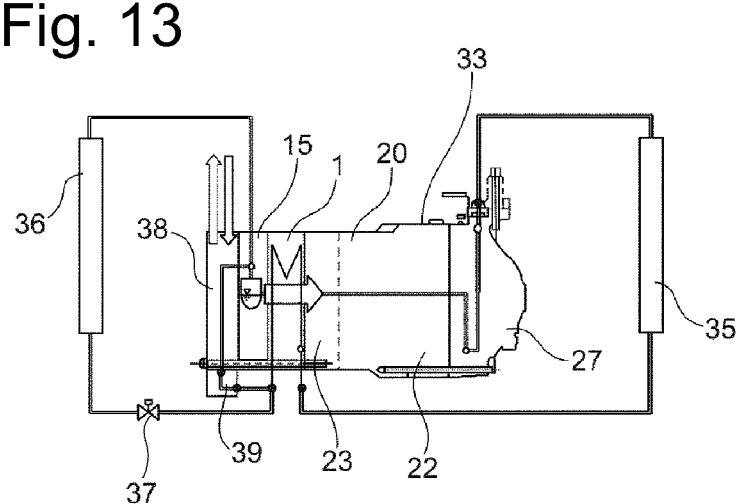
FIG. 13: Circuit diagram of a refrigerant circuit with schematic diagram of the compressor module.

FIG. 13 shows a refrigerant circuit with the compressor module 33 that is similar to the depiction from FIG. 10 and FIG. 7. In contrast to the aforementioned embodiments, the refrigerant on the low-pressure side flows via the inlet port of the compressor module 33 to the refrigerant collector 15 and subsequently via the inverter in the inverter housing 23 to the electric motor in the motor housing 20, as well as the central housing 22 to the high-pressure housing 27.

Figure 14:
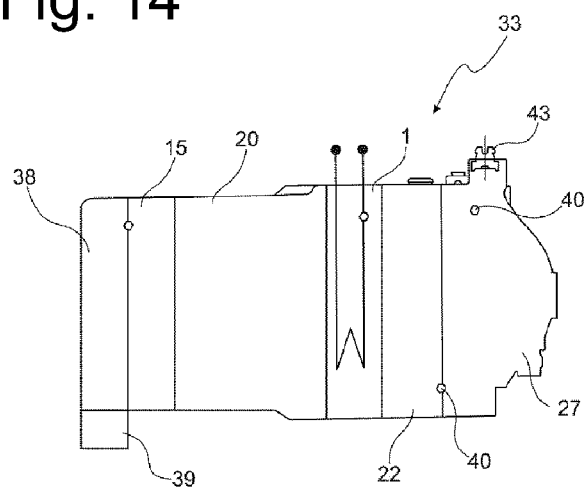
FIG. 14: Schematic diagram of a compressor module with multi-part housing.

The compressor module 33 from FIG. 13 is shown in greater detail in FIG. 14. The chiller 38 and its accompanying expansion element 39 are integrated into the compressor module 33. Subsequently, the refrigerant collector 15, the motor housing 20, the inner heat exchanger 1, the central housing 22 and the high-pressure housing 27 are arranged one after the other in series. The flow of refrigerant on the low-pressure side starts with refrigerant at high pressure at the expansion element 39 of the chiller 38 and is routed via the refrigerant collector 15 to the electric motor in the motor housing 20, via the inner heat exchanger 1 to the central housing 22 and to the high-pressure housing 27, all the way to the refrigerant outlet 43 at high pressure.

Figure 15:
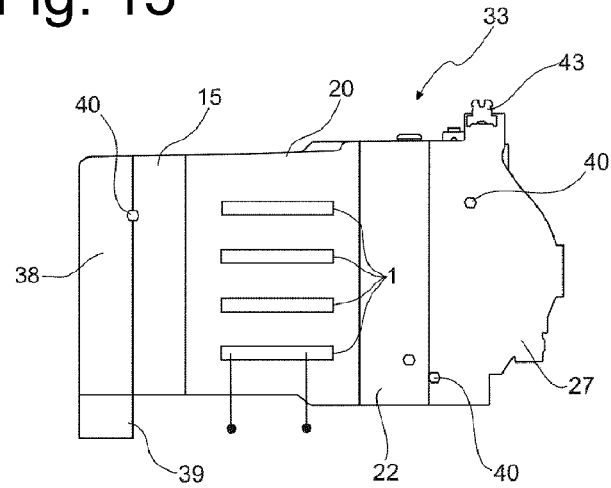
FIG. 15: Schematic diagram of a compressor module with multi-part housing.

FIG. 15 then ultimately shows a compressor module 33 that employs a similar design to the modules from FIGS. 12 and 9, wherein the chiller 38 with the expansion element 39, subsequently the refrigerant collector 15 and, in the motor housing 20, the inner heat exchanger 1 and then the central housing 22 and the high-pressure housing 27 are arranged. The flow of refrigerant on the low-pressure side, on the other hand, starts with refrigerant at high pressure at the expansion element 39 of the chiller 38. The inner heat exchanger is arranged parallel to the electric motor in the motor housing 20. In three other operating modes, the expansion element 39, the chiller 38 and the refrigerant collector 15 are flown through before, in an alternative version, the electric motor in the motor housing 20, as well as subsequently the inner heat exchanger 1 and then the scroll compressor unit in the high-pressure housing 27 are flown through.

In one version, the inner heat exchanger 1 and then the electric motor in the motor housing 20 are flown through after the refrigerant collector 15, followed by the scroll compressor unit. In another alternative, the electric motor and the inner heat exchanger 1 are flown through in parallel, before the refrigerant is routed to the high-pressure housing 27 with the scroll compressor unit.

Figure 16:
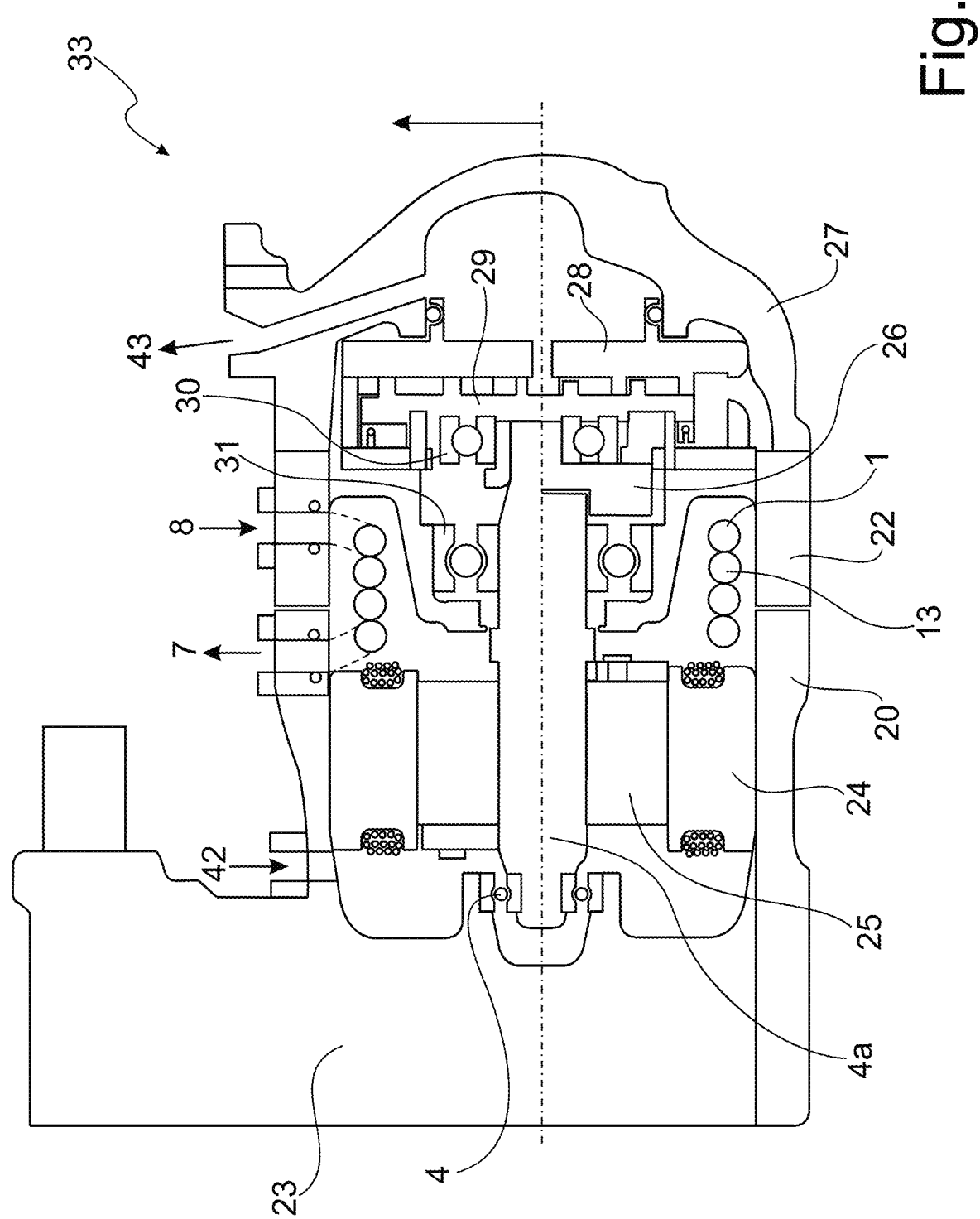
FIG. 16: Longitudinal cross-section of a compressor module with integrated inner heat exchanger.

FIG. 16 shows the longitudinal cross-section of a compressor module 33. Here, the individual components of the compressor module 33 are shown along the center line of the shaft 4a of the compressor. The compressor module 33 contains the compressor for the refrigerant as its main component, as well as an inner heat exchanger 1. The inner heat exchanger exhibits a coiled tube 13 as a high-pressure line with the inlet 8 of the inner heat exchanger 1 and the outlet 7 of the inner heat exchanger for the refrigerant at high pressure. The low-pressure flow path inside the compressor module 33 is formed from the refrigerant inlet 42 at low pressure to the refrigerant outlet 43 at high pressure following compression of the refrigerant.

On the path from the refrigerant inlet 42 to the refrigerant outlet 43, the refrigerant gas passes the coiled tube 13 with the refrigerant of the inner heat exchanger 1 at high pressure and absorbs heat from this.

The electronic components of the electrical refrigerant compressor, which is produced as a scroll compressor, are arranged in the inverter housing 23. The motor housing 20, into which the inverter housing 23 transitions, is positioned immediately downstream of the inverter housing 23 in the axial direction. The shaft 4a of the compressor is mounted in the motor bearings 4 in the motor housing 20.

The rotor 25 of the electric compressor's electric motor is arranged around the shaft 4a, while the stator 24 is coaxially spaced radially from this. In the motor housing 20, the shaft 4a is held in the motor bearing 4 at one end, while on the other side the main bearing 31 is arranged in the central housing 22. The shaft 4a moves the orbiting scroll 29, which is mounted in the bearing 30 of the orbiting scroll. The fixed scroll 28 is attached in the high-pressure housing 27. The central housing 22 is arranged between the motor housing 20 and the high-pressure housing 27. It houses the main bearing 31, the bearing 30 of the orbiting scroll and the counterweight 26. The flow path of the gaseous refrigerant runs from the refrigerant inlet 42 at low pressure, through the components of the motor to its cooling, over the coiled tube 13 of the inner heat exchanger 1 and is ultimately routed between the scrolls 28 and 29, where the compression of the refrigerant takes place. The compressed refrigerant then exits the housing 27, and thereby also the compressor module 33, at high pressure via the refrigerant outlet 43.

Figure 17:
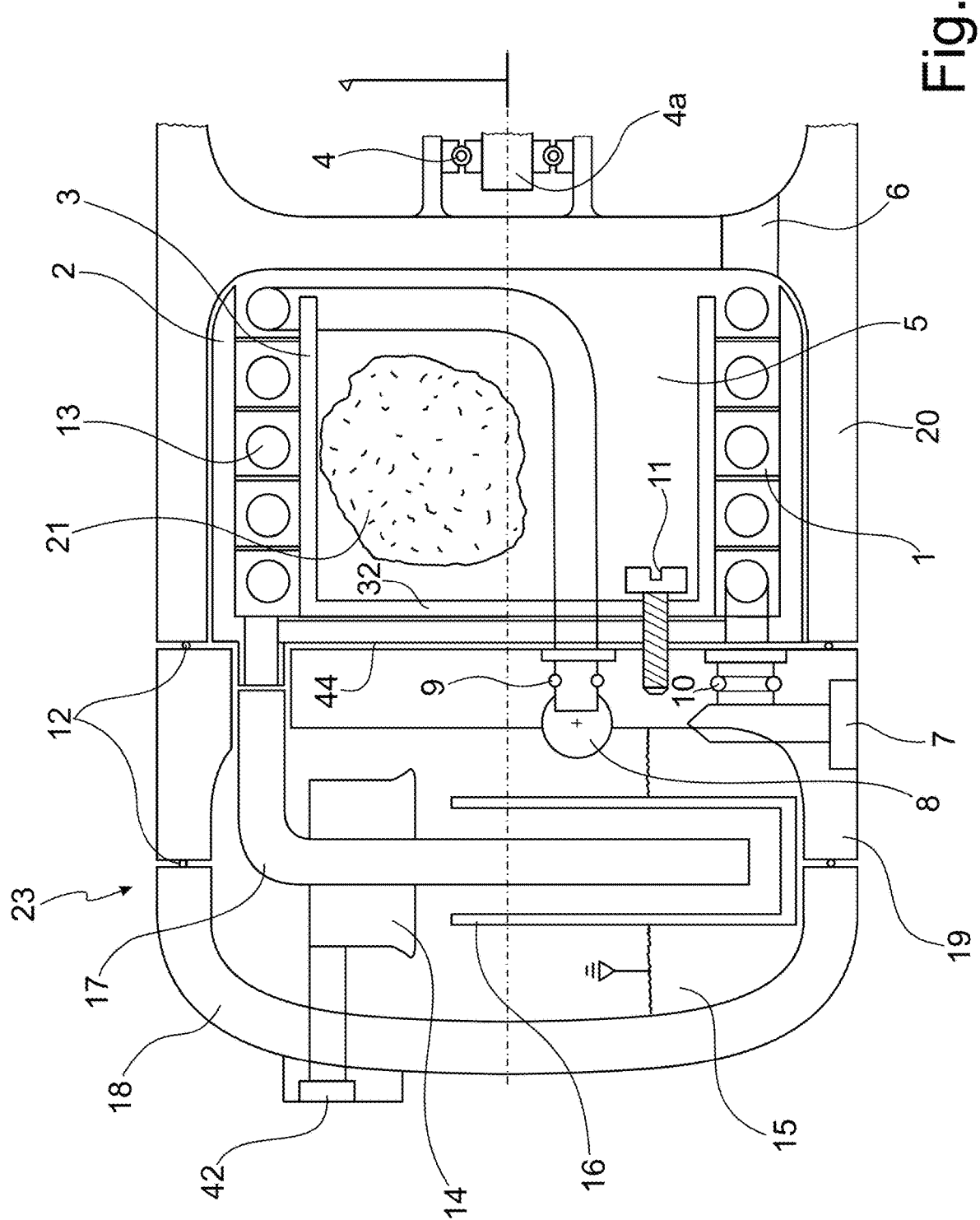
FIG. 17: Longitudinal cross-section with partial view of a compressor module with integrated refrigerant collector and inner heat exchanger.

FIG. 17 shows extracts of a compressor module 33, wherein the depiction is restricted to the section upstream of the actual compression process. The design of the compressor module 33 in this embodiment comprises a housing cover 18, a central housing or a middle housing 19 and then the motor housing 20. Housing seals 12 are arranged between the individual housing modules which together create the housing for the entire compressor module 33 in the form of segments and discs and render the housing outwardly pressure-tight.

The housing cover 18 and the central housing 19 enclose the section of the refrigerant collector 15 in which the liquid refrigerant is separated and collected from the refrigerant vapor stream at low pressure. A cup-shaped separating element 16 is produced in the refrigerant collector 15, into which the gas intake pipe 17 of the inner heat exchanger 1 projects. The liquid separator 14 outwardly spans the separating element 16 like a funnel, wherein the refrigerant vapor, potentially exhibiting refrigerant liquid in the form of droplets, is routed via the refrigerant inlet 42 at low pressure and the liquid separator 14 into the refrigerant collector 15. The refrigerant liquid that sticks then drips down at the walls of the liquid separator 14 and is collected on the base in the refrigerant collector 15. The refrigerant vapor is then routed via the gas intake pipe 17 into the inner heat exchanger 1 and flows over the coiled tube 13. The warm refrigerant that flows in the coiled tube 13 at high pressure is cooled by the cold refrigerant gas flowing over the coiled tube 13 in the inner heat exchanger 1. The high-pressure refrigerant flows from the inlet 8 into the inner heat exchanger 1 and, after passing over the coiled tube 13, exits the compressor module 33 at the outlet 7.

The coiled tube 13 is secured at the outlet 7 from the compressor module 33 with a seal 10, and a corresponding seal 9 is also provided at the inlet 8.

The inner heat exchanger 1 is formed and outwardly limited by an outer guide housing 2 and an inner guide housing 3, wherein the inner guide housing 3 in the shown embodiment is produced as a hollow cylinder in the axial direction and exhibits a base 32. The base 32, as the axial limitation, and the hollow cylindrical wall, as the radial limitation, together create a pot-shaped design for the inner guide housing 3.

The outer guide housing 2 is designed in a similar way with a hollow cylindrical wall and also has a base 44, which in turn results in a pot-shaped design. These two pot-shaped housings are arranged coaxially to the shaft 4a in the motor housing 20 and house the coiled tube 13 between the cylindrical walls that extend in the axial direction. The refrigerant gas, coming from the gas intake pipe 17, flows into the intermediate space between the pot-shaped outer guide housing 2 and the pot-shaped inner guide housing 3, and subsequently flows over the coiled tube 13 in the axial direction, thereby transferring heat, before the refrigerant vapor is then routed inside the inner guide housing 3. A filter material 21 is arranged here and potentially binds the moisture in the refrigerant vapor. The inner guide housing 3 is inserted into the outer guide housing 2 and the base 32 is in contact with the base 44. The two bases 32 and 44 of the outer guide housing 2 and the inner guide housing 3 are mechanically connected to one another with a screw 11. After flowing through the inner guide housing 3 of the inner heat exchanger 1, the refrigerant gas is routed via the suction pressure channel 6 to the compressor.

In the depiction shown as per FIG. 17, the shaft 4a and its motor bearing 4 at one end is implied.

The system is supplemented by a filter 5, which is typically fitted in the refrigerant circuit as a 100% particulate filter. The filter 5 can be placed in multiple positions, for example between the inner heat exchanger 1 and the motor housing 20, in the compressor inlet section or other positions in which the refrigerant flows through the components in a limited installation space.

Figure 18:
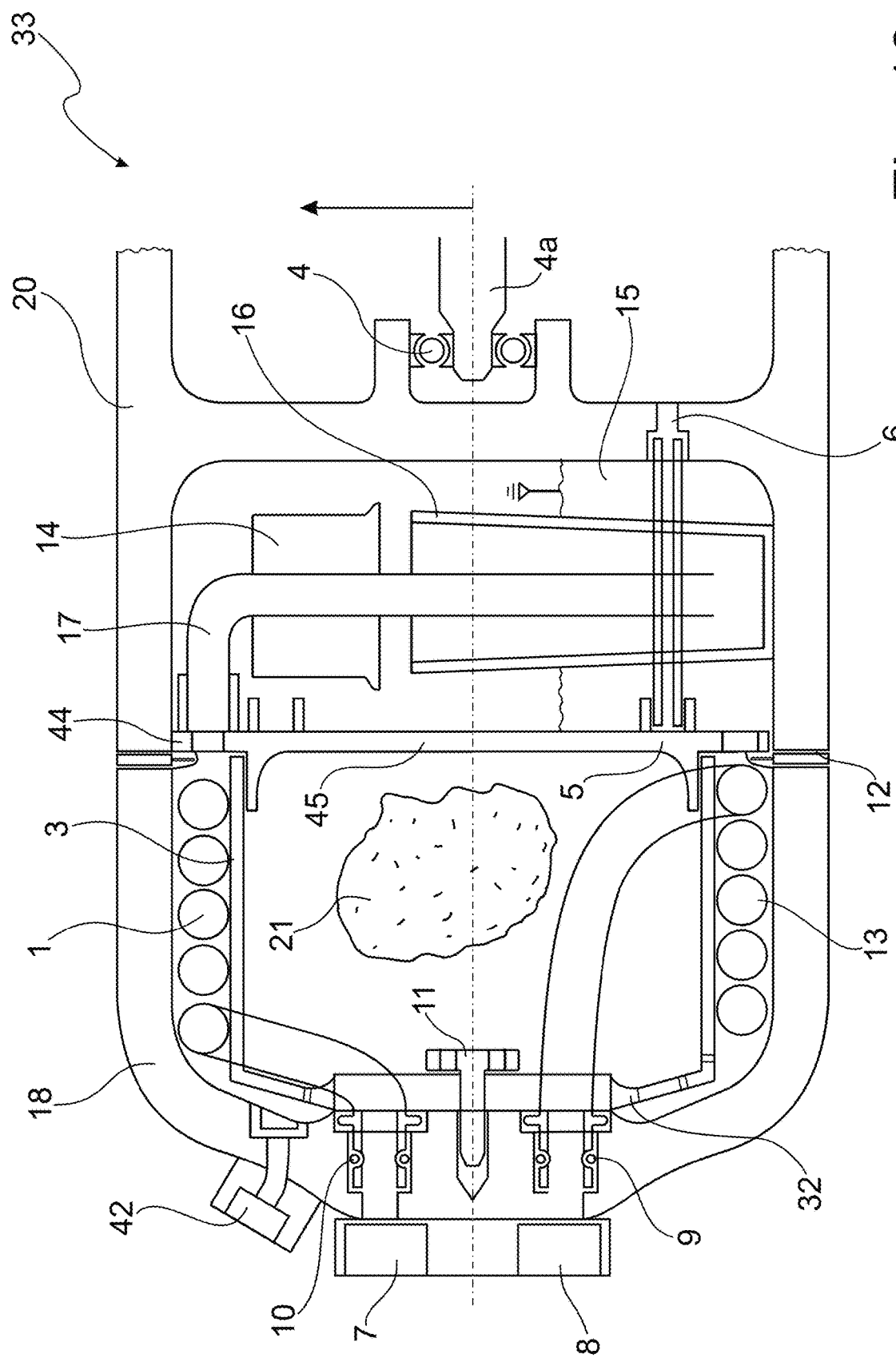
FIG. 18: Longitudinal cross-section of a compressor module with inner heat exchanger positioned at the end.

FIG. 18 shows a different embodiment of the compressor module 33. One key difference here lies in the fact that the refrigerant collector 15 has now been relocated out of the housing cover 18 and into the motor housing 20, whereas the inner heat exchanger 1 has been relocated out of the motor housing 20 and into the housing cover 18. The design of the refrigerant collector 15 with the liquid separator 14, the separating element 16 and the gas intake pipe 17 essentially corresponds to the refrigerant collector 15 already described in FIG. 17.

The inner heat exchanger 1, on the other hand, is designed as a coiled tube 13 that is arranged between a cylindrical section of the housing cover 18 and an inner guide housing 3 of the inner heat exchanger 1. To limit the space for the filter material 21, a disc-shaped partition element 45 is produced as a limiting plate. This exhibits corresponding mounting fixtures for the inner guide housing 3. The base 32 of the inner guide housing 3 is fixed in place in the housing cover 18 with a screw 11. One special characteristic of this design lies in the fact that the coiled tube 13 is routed from the inner heat exchanger 18 in the radial direction to the housing cover for the inlet 8 and outlet 7. The ends of the coiled tube 13 are sealed using seals 9 and 10. The low-pressure refrigerant inlet 42 is also located on the housing cover 18. The suction pressure channel 6 routes the refrigerant gas to the compressor, which is only implied by the shaft 4a and the motor bearing 4. The base 44 is then reduced to simply being a bracket for the gas intake pipe 17.

A housing seal 12 is arranged between the housing cover 18 and the motor housing 20. A filter 5 supplements the system to protect the components from particulates.

Figure 19:
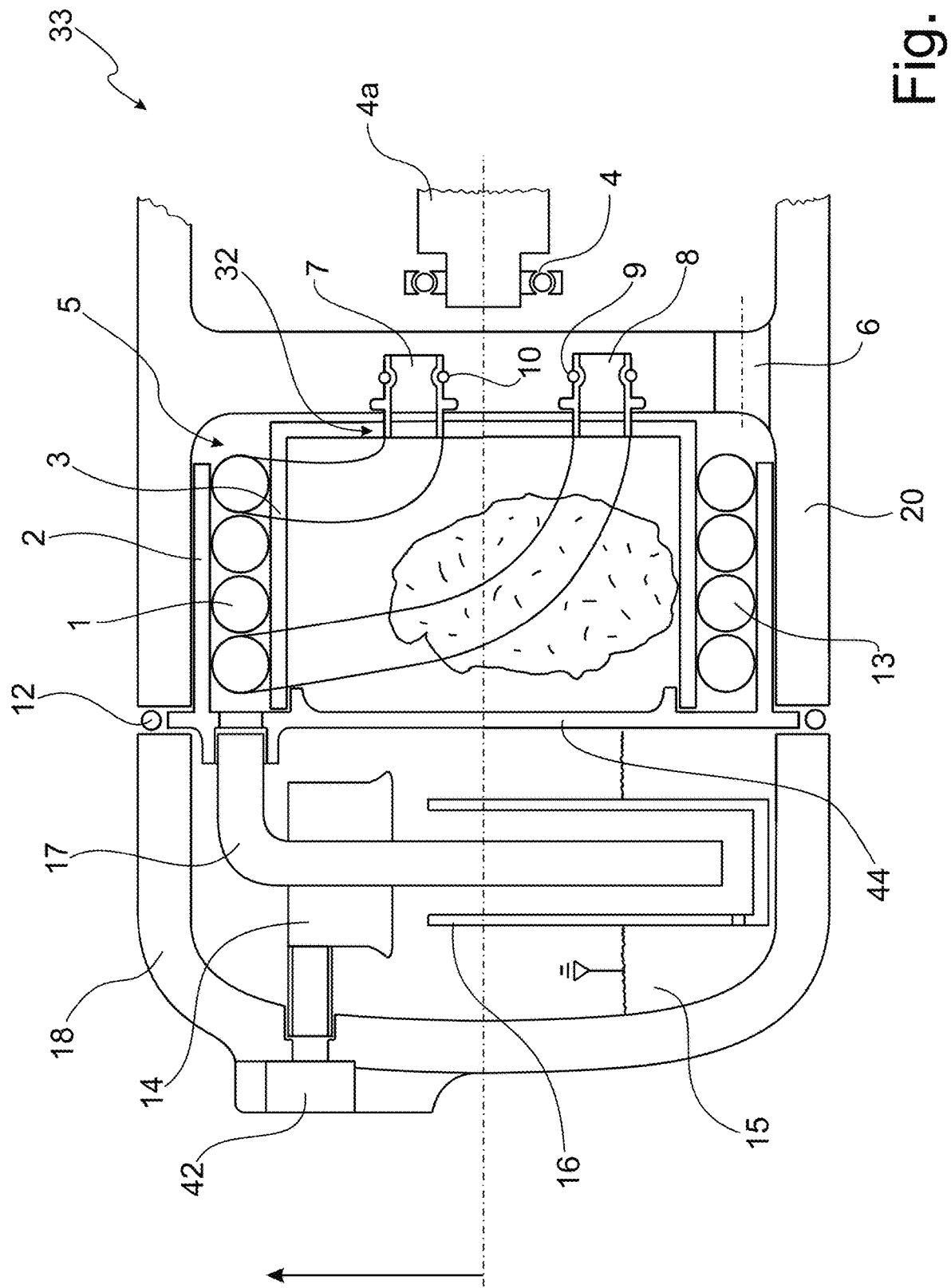
FIG. 19: Compressor module with inner heat exchanger in the motor housing.

FIG. 19 shows another alternative embodiment of the compressor module 33. Here, the inner heat exchanger 1 is arranged in the motor housing 20, while the refrigerant collector 15 is arranged in the housing cover 18. The design of the refrigerant collector 15 with its components, namely the cup-shaped separating element 16, the gas intake pipe 17 and the liquid separator 14 with the connection for the low-pressure refrigerant inlet 42, corresponds to the designs described in FIGS. 17 and 18.

The inner heat exchanger 1 is designed with a cylindrical outer guide housing 2 with a base 44 and a cylindrical inner guide housing 3 with a base 32, as well as a coiled tube 13, arranged between the cylindrical sections, for the high-pressure refrigerant. In this embodiment, the base 32 of the pot-shaped inner guide housing 3 is arranged opposite the base 44 of the outer guide housing 2. The filter material is arranged in the intermediate space and shown schematically. A housing seal 12 is produced between the housing cover 18 and the motor housing 20. The suction pressure channel 6 to the compressor is designed similarly to the depiction shown in FIGS. 17 and 18. The coiled tube 13 is integrated at the ends as inlet 8 and outlet 7 of the inner heat exchanger 1 using seals 9 and 10 such that it projects through the base 32 in the axial direction and the corresponding connections are introduced into the compressor module 33 from the outside. Similarly to FIGS. 18 and 17, the compressor itself is implied by the shaft 4a and the motor bearing 4, although it is not expressly shown.

However, a filter 5 is present to protect the components of the refrigerant circuit from particulates.

The present invention relates to a compressor module for a refrigerant circuit of a motor vehicle air-conditioning system. The compressor module implements an integrated design of various components and functionalities of a refrigerant circuit within a modular component.

The invention claimed is:

1. A compressor module for a refrigerant circuit of a motor vehicle air-conditioning system, comprising:
    a modular multi-part housing with a low-pressure refrigerant inlet, a high-pressure refrigerant outlet; and
    a compressor wherein an inner heat exchanger of the refrigerant circuit is produced such that it is integrated into the compressor module, and wherein the housing of the compressor module fully encloses the inner heat exchanger, wherein the housing includes a motor housing, a high-pressure housing, and a central housing disposed between the motor housing and the high-pressure housing, wherein a refrigerant is routed via the motor housing and the central housing to the high-pressure housing, and wherein the inner heat exchanger is disposed in front of the motor housing in a flow of refrigerant, or within the motor housing, or within the central housing, or between the motor housing and the central housing.

2. The compressor module according to claim 1, wherein at least one refrigerant sensor is produced such that it is integrated into the housing of the compressor module.

3. The compressor module according to claim 1, wherein a refrigerant collector of the refrigerant circuit is produced such that it is integrated into the housing of the compressor module.

4. The compressor module according to claim 3, wherein another heat exchanger of the refrigerant circuit is produced such that it is integrated into the housing of the compressor module.

5. The compressor module according to claim 4, wherein the heat exchanger is produced as a chiller and that an expansion element, positioned upstream of the chiller, is produced such that it is integrated into the housing of the compressor module.

6. The compressor module according to claim 5, wherein the housing of the compressor module is produced from disc-type housing parts.

7. The compressor module according to claim 1, wherein the housing of the compressor module is produced from an inverter housing, the motor housing, the central housing, and the high-pressure housing, wherein the refrigerant is routed from the low-pressure refrigerant inlet, via the inverter housing, the motor housing, and the central housing to the high-pressure housing, and wherein the inner heat exchanger is arranged in the central housing.

8. The compressor module according to claim 3, wherein the housing of the compressor module is produced from a housing for the refrigerant collector, a housing for the inner heat exchanger, the motor housing, the central housing, and the high-pressure housing, wherein the refrigerant is routed from the low-pressure refrigerant inlet, via the refrigerant collector, the inner heat exchanger, the motor housing, and the central housing to the high-pressure housing and that the inner heat exchanger is arranged between the refrigerant collector and the motor housing.

9. The compressor module according to claim 5, wherein the housing of the compressor module is produced from a housing for the chiller and the expansion element, a housing for the refrigerant collector, a housing for the inner heat exchanger, the motor housing, the central housing and the high-pressure housing, wherein the refrigerant is routed from the low-pressure refrigerant inlet, via the expansion element, the chiller, the refrigerant collector, the inner heat exchanger, the motor housing, and the central housing to the high-pressure housing, and wherein the inner heat exchanger is arranged between the refrigerant collector and the motor housing.

10. The compressor module according to claim 1 wherein the housing of the compressor module is produced from an inverter housing, the motor housing, a housing for the inner heat exchanger, the central housing, and the high-pressure housing, wherein the refrigerant is routed from the low-pressure refrigerant inlet, via the motor housing and the central housing to the high-pressure housing, and wherein the inner heat exchanger is arranged in the central housing and between the motor housing and the high-pressure housing.

11. The compressor module according to claim 1, wherein the housing of the compressor module is produced from an inverter housing, a housing for the inner heat exchanger, the motor housing, the central housing, and the high-pressure housing, wherein the refrigerant is routed from the low-pressure refrigerant inlet, via the inverter housing, the housing for the inner heat exchanger, the motor housing, and the central housing to the high-pressure housing, and wherein the inner heat exchanger is arranged between the inverter housing and the motor housing.

12. The compressor module according to claim 1, wherein the housing of the compressor module is produced from an inverter housing, the motor housing, the central housing, and the high-pressure housing, wherein the refrigerant is routed from the low-pressure refrigerant inlet, via the inverter housing, the inner heat exchanger, the motor housing, and the central housing to the high-pressure housing or via the inverter housing, the motor housing, the inner heat exchanger, and the central housing to the high-pressure housing or via the inverter housing and, in parallel, via the inner heat exchanger and the motor housing and subsequently via the central housing to the high-pressure housing, and wherein the inner heat exchanger is arranged in the motor housing and between the inverter housing and the central housing.

13. The compressor module according to claim 1, wherein the housing of the compressor module is produced from a housing for a refrigerant collector, a housing for the inner heat exchanger, the motor housing, the central housing, and the high-pressure housing, wherein the refrigerant is routed from the low-pressure refrigerant inlet, via the housing for the refrigerant collector, the housing for the inner heat exchanger, the motor housing, and the central housing to the high-pressure housing, and wherein the inner heat exchanger is arranged between the refrigerant collector and the motor housing.

14. The compressor module according to claim 1, wherein the housing of the compressor module is produced from a housing for a refrigerant collector, a housing for the inner heat exchanger, an inverter housing, the motor housing, the central housing, and the high-pressure housing, wherein the refrigerant is routed from the low-pressure refrigerant inlet, via the housing for the refrigerant collector, the housing for the inner heat exchanger, the inverter housing, the motor housing, and the central housing to the high-pressure housing and that the inner heat exchanger is arranged between the refrigerant collector and the inverter housing.

15. The compressor module according to claim 1, wherein the housing of the compressor module is produced from a housing for a refrigerant collector, the motor housing, a housing for the inner heat exchanger, the central housing, and the high-pressure housing, wherein the refrigerant is routed from the low-pressure refrigerant inlet, via the housing for the refrigerant collector, the motor housing, the inner heat exchanger, and the central housing to the high-pressure housing, and wherein the inner heat exchanger is arranged between the motor housing and the central housing.

16. The compressor module according to claim 1, wherein the housing of the compressor module is produced from a housing for a refrigerant collector, the motor housing, the central housing, and the high-pressure housing, wherein the re-frigerant is routed from the low-pressure refrigerant inlet, via the refrigerant collector, the inner heat exchanger, the motor housing, and the central housing to the high-pressure housing or via the refrigerant collector, the motor housing, the inner heat exchanger, and the central housing to the high-pressure housing or via the refrigerant collector and, in parallel, via the inner heat exchanger and the motor housing and subsequently via the central housing to the high -pressure housing, and wherein the inner heat exchanger is arranged in the motor housing and between the refrigerant collector and the central housing.

17. The compressor module according to claim 1, wherein the housing of the compressor module is produced from a housing for a chiller and an expansion element, a housing for a refrigerant collector, a housing for the inner heat exchanger, an inverter housing, the motor housing, the central housing, and the high-pressure housing, wherein the refrigerant is routed from the low-pressure refrigerant inlet, via the expansion element, the chiller, the refrigerant collector, the inner heat exchanger, the inverter housing, the motor housing, and the central housing to the high-pressure housing, and wherein the inner heat exchanger is arranged between the refrigerant collector and the inverter housing.

18. The compressor module according to claim 1, wherein the housing of the compressor module is produced from a housing for a chiller and an expansion element, a housing for a refrigerant collector, the motor housing, a housing for the inner heat exchanger, the central housing, and the high-pressure housing, wherein the refrigerant is routed from the low-pressure refrigerant inlet, via the expansion element, the chiller, the refrigerant collector, the motor housing, the inner heat exchanger, and the central housing to the high-pressure housing, and wherein the inner heat exchanger is arranged between the motor housing and the central housing.

19. The compressor module according to claim 1, wherein the housing of the compressor module is produced from a housing for a chiller and an expansion element, a housing for a refrigerant collector, the motor housing, the central housing, and the high-pressure housing, wherein the refrigerant is routed from the low-pressure refrigerant inlet, via the expansion element, the chiller, the refrigerant collector, the inner heat exchanger, the motor housing, and the central housing to the high-pressure housing or via the expansion element, the chiller, the refrigerant collector, the motor housing, the inner heat exchanger, and the central housing to the high-pressure housing or via the expansion element, the chiller, the refrigerant collector, and, in parallel, via the inner heat exchanger and the motor housing and subsequently via the central housing to the high-pressure housing and that the inner heat exchanger is arranged in the motor housing and between the refrigerant collector and the central housing.

20. A compressor module for a refrigerant circuit of a motor vehicle air-conditioning system, comprising:
a modular multi-part housing with a low-pressure refrigerant inlet, a high-pressure refrigerant outlet; and
a compressor wherein an inner heat exchanger of the refrigerant circuit is produced such that it is integrated into the compressor module, and wherein the housing of the compressor module fully encloses the inner heat exchanger, wherein the inner heat exchanger is produced as a cylindrical coiled tube that is arranged coaxially to a shaft of the compressor.

21. The compressor module according to claim 20, wherein the inner heat exchanger is housed partially by the motor housing and partially by a central housing in an axial direction and enclosed in a radial direction by the motor housing and by the central housing.

22. The compressor module according to claim 1, wherein the inner heat exchanger is arranged coaxially between an outer guide housing and an inner guide housing in a radial direction.

23. A compressor module for a refrigerant circuit of a motor vehicle air-conditioning system, comprising:
 a modular multi-part housing with a low-pressure refrigerant inlet, a high-pressure refrigerant outlet; and
 a compressor wherein an inner heat exchanger of the refrigerant circuit is produced such that it is integrated into the compressor module, and wherein the housing of the compressor module fully encloses the inner heat exchanger, wherein a refrigerant collector is arranged in a housing cover that limits one end of the motor housing axially and in a middle housing disposed between the housing cover and the motor housing, and wherein the refrigerant collector exhibits a liquid separator, a cup-shaped separating element, and a gas intake pipe for the inner heat exchanger to capture refrigerant liquid from a refrigerant gas stream.

24. The compressor module according to claim 20, wherein the inner heat exchanger is arranged coaxially between an inner guide housing and a cylindrical section of a housing cover in a radial direction, wherein a disc-type partition element is arranged in an axial direction as a limit towards a refrigerant collector.

25. The compressor module according to claim 20, wherein the inner heat exchanger is arranged coaxially between an outer guide housing and an inner guide housing in a radial direction, wherein the outer guide housing exhibits a disc-type partition element in an axial direction as a limit towards a refrigerant collector.

26. The compressor module according to claim 25, wherein the inner guide housing is produced in such a way that it can hold a filter material and exhibits a filter.

27. The compressor module according to claim 1, wherein the compressor is produced as an electric compressor.

28. The compressor module according to claim 1, wherein the compressor is produced as a scroll compressor.

29. A compressor module for a refrigerant circuit of a motor vehicle air-conditioning system, comprising:
 a modular multi-part housing with a low-pressure refrigerant inlet, a high-pressure refrigerant outlet; and
 a compressor wherein an inner heat exchanger of the refrigerant circuit is produced such that it is integrated into the compressor module, and wherein the housing of the compressor module fully encloses the inner heat exchanger, wherein a refrigerant collector of the refrigerant circuit is produced such that it is integrated into the housing of the compressor module, and wherein another heat exchanger of the refrigerant circuit is produced such that it is integrated into the housing of the compressor module.

* * * * *